United States Patent [19]

Scott

[11] Patent Number: 4,481,703
[45] Date of Patent: Nov. 13, 1984

[54] METHOD OF MAKING RIB STRUCTURES FOR AN AIRFOIL

[75] Inventor: Harry A. Scott, Hawthorne, Calif.

[73] Assignee: Rockwell International Corporation, Los Angeles, Calif.

[21] Appl. No.: 358,775

[22] Filed: Mar. 17, 1982

Related U.S. Application Data

[62] Division of Ser. No. 124,196, Feb. 25, 1980, Pat. No. 4,356,616.

[51] Int. Cl.³ .................... B23P 17/00; B64C 3/18
[52] U.S. Cl. ..................... 29/526 A; 29/455 LM; 244/123
[58] Field of Search ............ 29/526 A, 455 LM; 244/123, 124, 131, 119, 117 R, 120; 52/84

[56] References Cited

U.S. PATENT DOCUMENTS

| | | | |
|---|---|---|---|
| 2,136,265 | 11/1938 | Petty | 244/123 |
| 2,330,185 | 9/1943 | Palmer | 244/123 |
| 2,360,433 | 10/1944 | Magruder | 244/123 |
| 2,427,853 | 9/1947 | Goodlett | 244/123 |
| 2,567,124 | 9/1951 | Roberts | 244/124 |

FOREIGN PATENT DOCUMENTS

| | | | |
|---|---|---|---|
| 701505 | 1/1941 | Fed. Rep. of Germany | 244/123 |
| 694343 | 9/1930 | France | 244/123 |
| 261489 | 11/1926 | United Kingdom | 244/123 |

Primary Examiner—Gene P. Crosby
Attorney, Agent, or Firm—Charles T. Silberberg

[57] ABSTRACT

A method is disclosed for fabricating rib structures of different sizes for a segment of an airfoil having both a spanwise taper in thickness and at least one aerodynamic surface having a substantially constant radius of curvature in the chordwise direction. In one embodiment a plurality of rib webs are formed at least as large as the largest rib structure. Each of the rib webs is trimmed at their lower edges progressively greater amounts to form rib webs of a proper size for each rib structure. A plurality of upper and lower rib caps as well as front and rear spar attachment brackets are formed and attached to the trimmed rib webs. In another embodiment the rib webs are formed with either or both integral upper rib caps and spar attachment brackets. In still another embodiment a plurality of rib webs are formed and joined together by twos by inverting one rib web to the other and progressively overlapping their lower edges and fastening them together to form properly sized rib structures. These rib webs are formed with either or both integral upper rib caps and spar attachment brackets or they can be formed separately and attached to the joined rib webs. In the case where the spars are not spanwise parallel, the rib webs are formed without spar attachment brackets and thereafter at least one end of the rib webs and rib caps, whether integral or not, are also trimmed progressively greater amounts so that they are of the proper size for each rib structure.

5 Claims, 5 Drawing Figures

METHOD OF MAKING RIB STRUCTURES FOR AN AIRFOIL

This is a division of application Ser. No. 124,196 filed Feb. 25, 1980, now U.S. Pat. No. 4,356,616.

BACKGROUND OF INVENTION

1. Field of Invention

The invention relates to the field of fabrication of airfoil structures and in particular to a method of fabricating rib structures of different sizes for an airfoil.

2. Description of Prior Art

A conventional airfoil usually has as its primary structure two or more spars extending spanwise along the airfoil spaced apart by a plurality of rib structures. Leading and trailing edge secondary structures are attached to this primary structure and all are enclosed by upper and lower wing skins. Additionally, mechanized control surfaces such as flaps, ailerons, etc., are incorporated. A typical example of an airfoil design is disclosed in U.S. Pat. No. 2,427,853, Aircraft Construction by E. R. Goodlett.

Past attempts to reduce the cost of fabricating airfoils by minimizing the amount of tooling required have not been particularly successful. For example, U.S. Pat. No. 2,360,433, Structural Member by P. M. Magruder uses two identical rib web halves which are overlapped on their bottom edges different amounts and joined together. Thus the capability of making rib structures for airfoils of tapering height is provided. A rib structure, made by using two such rib web halves, one inverted from the other, and assembled with a lap joint, as Magruder proposes, requires that one rib cap be facing inboard and the other outboard. While the airfoil can be made to taper in thickness, one of the rib caps, whether having an acute or obtuse angle relative to the rib web, will not be properly aligned with the taper angle of the airfoil since the rib web halves are inverted in forming the rib structures. Thus rib web halves with different rib cap angles will be necessary if they are to conform to the taper angle of the airfoil. This will require two separate fabrication tools.

In a second embodiment Magruder discloses a method of making rib structures that vary both in height and chord (length). This is accomplished by making the rib structure from four quarter pieces and overlapping their ends and lower edges. This four-piece rib structure has the disadvantages previously mentioned and furthermore can only provide a smooth aerodynamic surface for one rib structure position in the spanwise direction. If the length is shortened, to produce a rib structure of reduced chord, an aerodynamically unacceptable sharp peak is formed at the overlapping point on the upper surface of the airfoil. Conversely, if the chord is lengthened, there is an unacceptable indentation created at this point.

Therefore, it is a primary object of this invention to provide a method of fabricating structures for an airfoil at a lower cost by minimizing the number of tools required.

Another object of this invention is to provide a method of fabricating rib structures of varying height for an airfoil that is spanwise tapered in thickness with one rib fabrication tool.

A still further object of this invention is to provide a method of making rib structures of varying height and chord for an airfoil that both tapers in thickness and chord.

SUMMARY OF THE INVENTION

A method is disclosed for fabricating rib structures of different sizes for mounting between spars in a segment of an airfoil which has both a spanwise taper in thickness and at least a portion of one aerodynamic surface having a constant radius of curvature in the chordwise direction. In one embodiment a plurality of rib webs are formed at least as large as the largest rib structures preferably having an upper edge conforming to the upper aerodynamic surface of the segment of the airfoil. Each of the plurality of rib webs are trimmed at their lower edges in progressively greater amounts to form rib webs of the proper size for each rib structure. A plurality of upper and lower rib caps are formed, having surfaces conforming to the aerodynamic surfaces of the segment of the airfoil, along with front and rear spar attachment brackets, all of which are attached to the trimmed rib webs. In another embodiment the rib webs are formed with either or both integral upper rib caps and spar attachment brackets and trimmed at their lower edges as in the previous embodiment.

In still another embodiment a plurality of rib webs are formed and joined together by twos by inverting one rib web to the other and progressively overlapping their lower edges and joining the two rib webs together to form properly sized rib structures. As with previous embodiments the rib webs can be formed with either or both integral upper rib caps and spar attachment brackets or they can be formed separately and attached after trimming.

When the spars are not spanwise parallel, the rib webs are formed without spar attachment brackets and at least one end of the rib webs and rib caps are trimmed in progressively greater amounts so that the completed rib structure is also of the proper chord as well as height.

The novel features which are believed to be characteristic of the invention, both as to its organization and its method of operation, together with further objects and advantages thereof, will be better understood from the following description in connection with the accompanying drawings in which presently preferred embodiments of the invention are illustrated by way of examples. It is to be expressly understood, however, that the drawings are for purposes of illustration and description only, and are not intended as a definition of the limits of the invention.

BRIEF DESCRIPTION OF THE DRAWINGS

Illustrated in

DESCRIPTION OF PREFERRED EMBODIMENTS

Figure 1:
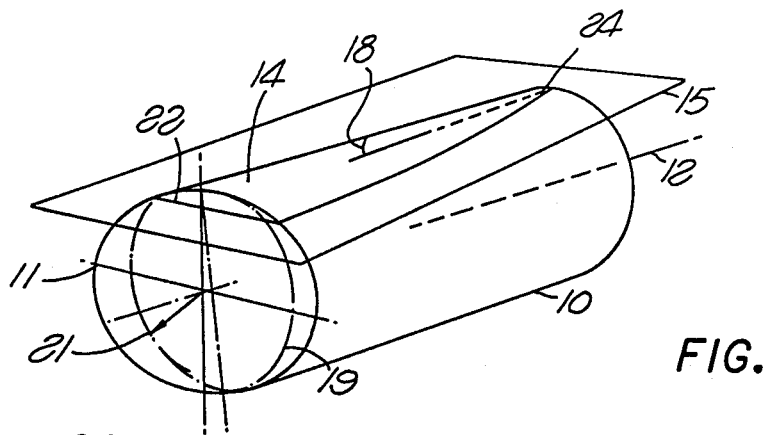
FIG. 1 is a perspective view of a cylinder, having a truncated elliptical portion.

A lower cost for fabrication of rib structures is obtained with the present invention primarily because the airfoil configuration is based on the shape of a truncated elliptical cylinder. Illustrated in FIG. 1 is a perspective view of an elliptical cylinder 10 having a major axis 11 and a longitudinal axis 12. An element 14 is formed by passing a cutting plane of truncation 15 at an angle of truncation 18 to the longitudinal axis 12 of the cylinder 10. The circular base 19 is a function of the angle of truncation 18 in that the cross-section through the cylinder 10 perpendicular to the plane of truncation 15 will be a circle. Thus the element 14 will have a planform that is a segment of an ellipse and an upper surface 20 having a circular, and therefore constant radius of curvature 21 at any point along the longitudinal axis 12. The element 14 will also taper in thickness and vary in chord from the first end 22 to the second end 24. An airfoil having a configuration based on the element 14, i.e., having a segment of its aerodynamic surface having both a spanwise taper and constant radius of curvature in the chordwise direction, can be fabricated, in a manner to be subsequently described, with minimal amounts of tooling, and thus at a lower cost.

Figure 2:
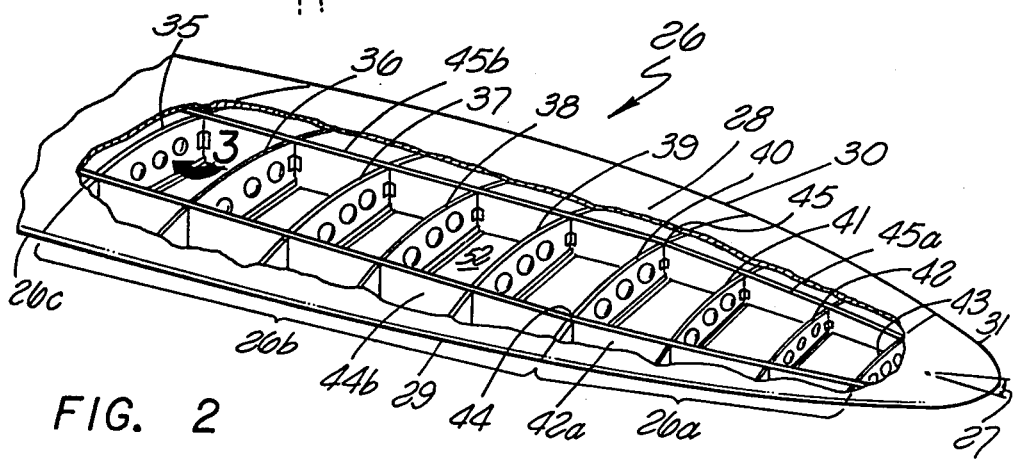
FIG. 2 illustrates a perspective view of an airfoil partially broken away to show the rib structures therein.

Illustrated in FIG. 2 is a perspective view of an airfoil 26 based, in part, on the configuration of the portion 14 shown in FIG. 1. The airfoil 26 is shown having three segments: segments 26a and 26b which taper in height along the span at an angle 27 and a segment 26c having no spanwise taper in thickness. The taper angle 27 corresponds to the angle of truncation 18 shown in FIG. 1. In most practical applications the nontapered segment 26c would not be used. The segments 26a and 26b have an upper aerodynamic surface 28 shown partially broken away to show the interior thereof. A plurality of rib structures 35, 36, 37, 38, 39, 40, 42 and 43, are provided, which are connected to front and rear spars 44 and 45, respectively, in a manner to be subsequently described. A portion of the surface 28 has a substantially constant radius of curvature in the chordwise direction which includes the area between the spars 44 and 45. The leading and trailing edges 29 and 30 respectively, the wing tip 31, and the non-tapered portion 26c, may or may not have a surface with a constant radius of curvature in the chordwise direction.

All the rib structures are generally similar in shape and thus subsequent descriptions can be essentially limited to rib structure 35. The segment 26a of the airfoil 26 has spar segments 44a and 45a which taper toward each other, thus, rib structures 41-43 have decreasing chords. Spar segments 44b and 45b, on the other hand, are parallel and thus rib structure 35-40 have a constant chord length. The airfoil 26 is shown with parallel and nonparallel spars for purpose of illustration and can have solely parallel spars or solely non-parallel spars.

Figure 3:
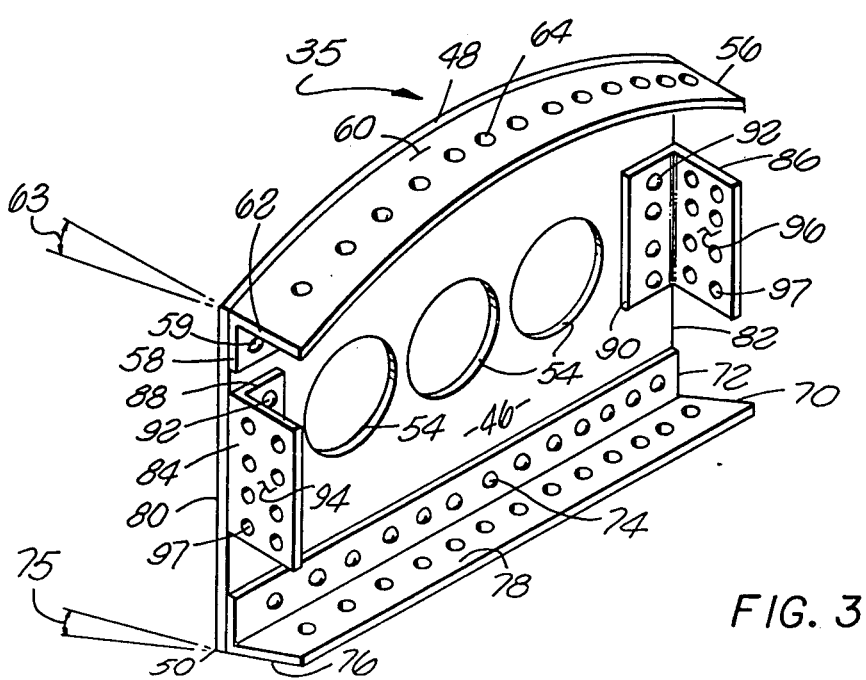
FIG. 3 illustrates an enlarged perspective view of a rib structure shown in FIG. 2 having a separately formed rib web, upper and lower rib caps and spar attachment brackets.

Referring still to FIG. 2 and, additionally, to FIG. 3 wherein an enlarged perspective view, in the direction of arrow 3, of the rib structure 35 (illustrated in FIG. 2) is shown, it is seen that the main component of the rib structure 35 is a rib web 46 having an upper edge 48 which has a, preferably, constant radius of curvature in the chordwise direction and a lower edge 50 adapted to conform to the contour of the lower aerodynamic surface 52 of the airfoil 26. The surface 52 may or may not have constant radius of curvature. The web 46 may also incorporate a plurality of lightening holes 54, if structural requirements permit, or, alternately, may have stiffening elements (not shown) attached thereto.

An upper rib cap 56 is attached by its first leg 58, near the edge 48 of the rib web 46 by means of fasteners, in the form of rivets 59 (only one is shown). Throughout the specification the components of the airfoil 26 are shown and described as joined together by rivets, but it should be noted that this is for purposes of illustration only. Other methods, such as welding, bonding or other types of mechanical fasteners may be used. The cap 56 is positioned so that the upper surface 60 of its second leg 62 is flush or slightly above the edge 48. The surface 60 conforms to the segment 26b and, thus, has a substantially constant radius of curvature in the chordwise direction approximately equal to the radius of curvature of the surface 28. Furthermore, the surface 60 tapers in the spanwise direction at a taper angle 63 equal to the taper angle 27 of the tapered portions 26a and 26b of the airfoil 26. The cap 56 typically incorporates a plurality of holes 64 for fasteners (not shown) for attaching the surface 28 thereto.

A lower rib cap 70 is attached by its first leg 72 near the lower edge 50 of the web 46 by means of rivets 74. The cap 70 is positioned so that the lower surface 76 on the second leg 78 is flush or slightly below the edge 50. The surface 76 has a spanwise taper angle 75 equal to the taper angle 27 and a chordwise contour conforming to the surface 52, which may or may not have a constant radius of curvature in the chordwise direction. Of course in some instances the surface 52 of FIG. 2 may be flat and/or have no taper at all (in which case the contour of surface 76 would so correspond).

Attached to the front and rear edges 80 and 82 of the web 46 are spar attachment brackets 84 and 86 respectively. The first legs 88 and 90 of the brackets 84 and 86, respectively, are attached by fasteners, typically in the form of rivets 92. The second legs 94 and 96 are adapted, by means of fastener holes 97, to attach to the front and rear spars 44 and 45 respectively by fasteners (not shown).

Having thus described the rib structure 35, it can be seen that because the upper edge 48 of the rib web 46 has a constant radius of curvature in the chordwise direction, as well as the surface 60 of the cap 58, tooling to make such a rib structure can be kept to a minimum because every other rib structure 35-43 will have the corresponding rib caps, necessarily, the same radius of curvature in the chordwise direction and spanwise taper angle 63a.

A preferred method for making such rib structure 41-43 is as follows:

1. A plurality of webs are formed to the size of the largest web, which in this case is web 46. Conventional fabrication techniques known to those skilled in the art can be used to make the webs 46 and all the other parts, whether they be metal or composites, or a combination of both. Note that all the rib webs can be fabricated using one tool.

2. The lower edge 50 of each of the plurality of rib webs 46 are progressively trimmed greater amounts so that there is a web of the proper size for each rib structure. The rib structures 41-43 change both in height and chord since they are located between the spar segments 44a and 45a which taper toward each other, as shown in FIG. 2, amounts are trimmed from either or both ends 80 and 82 to provide a web of the proper chord.

3. A plurality of rib caps 56 and 70 are formed having a length sufficient for use on the largest rib structure, i.e., rib structure 46. Note again, that only one tool is required to make rib caps 56 for all the rib structures.

4. Each of the plurality of rib caps 56 and 70 are trimmed on at least one end progressively greater amount so as to form rib caps of the proper length for use on the rib structures.

5. A plurality of spar attachment brackets 84 and 86 are formed. Again, note that only one tool is required to make the brackets.

6. All of the above parts are then joined to form the rib structures 41–43.

Figures 4, 5:
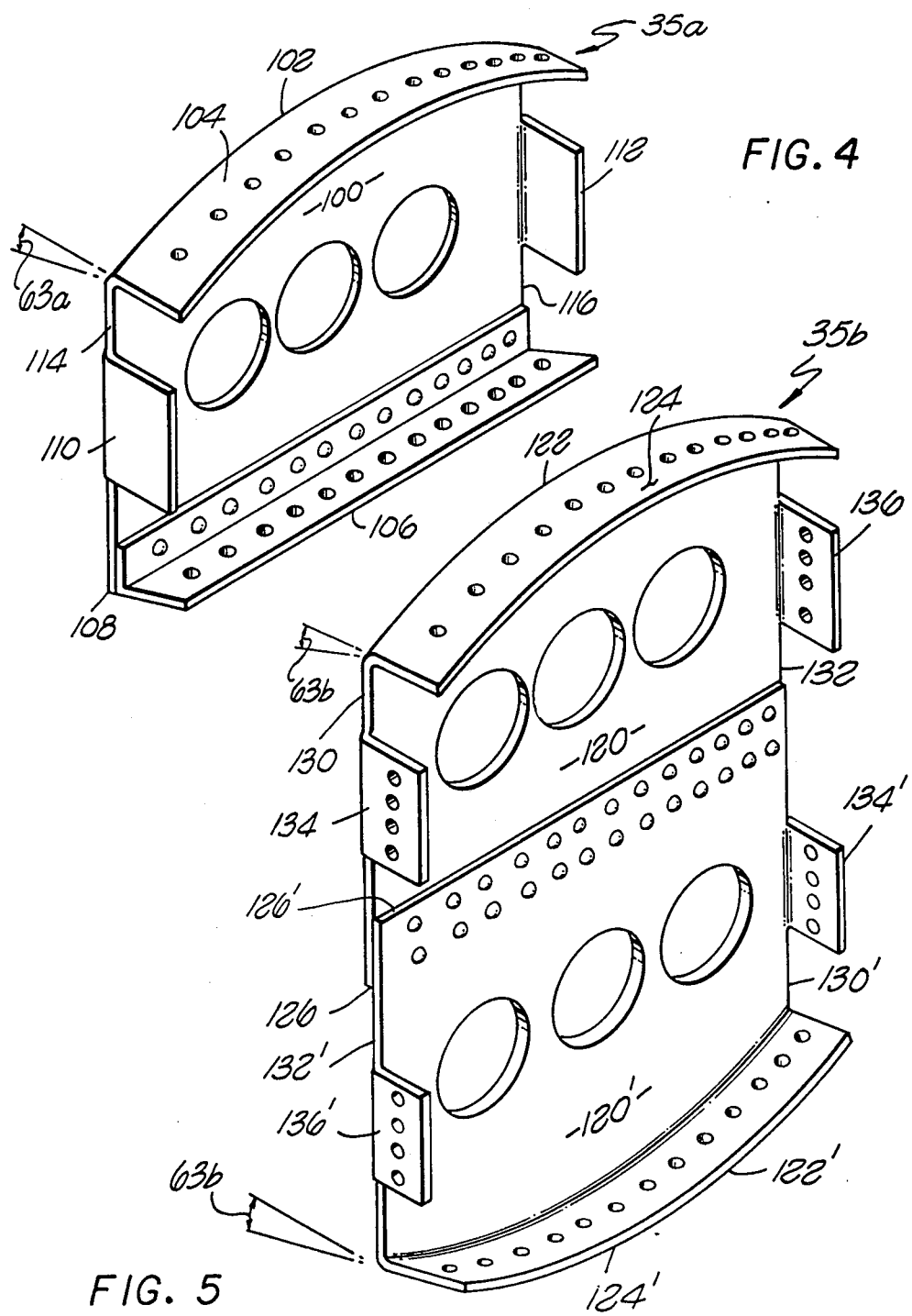
FIG. 4 illustrates a second embodiment of the rib structures shown in FIG. 2 wherein the rib web has an integrally formed upper rib cap and spar attachment brackets.
FIG. 5 illustrates a third embodiment of the rib structure shown in FIG. 2 wherein the rib structure comprises a first rib web inverted and joined at its lower edge to the lower edge a second rib web.

When making rib structures 35–40, which are located between spars 44b and 45b, the plurality of rib webs 46 and upper and lower rib caps 56 and 75 need not be trimmed in length, and, thus, can be formed with integral spar attachment brackets (shown in FIG. 4). The method of fabrication is otherwise similar except that spar attachment brackets 84 and 86 need not be formed.

Still referring to FIG. 2 and additionally to FIG. 4 wherein a rib structure 35a is illustrated that can be substituted for the rib structure 35, shown in FIG. 3. The rib structure 35a comprises a rib web 100 with an integrally formed upper rib cap 102 having an upper surface 104. Surface 104 also conforms to the airfoil segments 26a and 26b and therefore has a substantially constant radius of curvature in the chordwise direction approximately equal to the radius of curvature of surface 28 and also has a taper angle 63a equal to the taper angle 27 of surface 28.

The lower rib cap 106 is similar to the lower rib cap 70 of the rib structure 35 shown in FIG. 3 and is attached to the lower edge 108 of the web 100 in a similar fashion.

When fabricating rib structures 35–40, which are located between parallel segments 44b and 45b spar attachment brackets 110 and 112 at the front and rear ends 114 and 116, respectively, are integrally formed with the web 100. If, on the other hand, when fabricating rib structures 41–43 which are located between spar segments 44a and 45a then the rib web 100 must be formed without the brackets 110 and 112 and brackets similar to brackets 84 and 86 of the rib structure 35, shown in FIG. 3 are fabricated and attached in the manner previously described.

A procedure for fabricating rib structures 41–43 according to the FIG. 4 approach is as follows:

1. A plurality of webs are formed to a size at least as large as the largest web 100 with integral upper rib caps 102.

2. The lower edge 108 and at least one end of each of the plurality of rib webs 100 are trimmed progressively greater amounts so that there is a web of the proper size for each rib structure.

3. A plurality of lower rib caps are formed having a length equal to the length of the largest lower rib cap 106.

4. Each of the plurality of lower rib caps 106 are progressively trimmed greater amounts so as to form lower rib caps of the proper length for each rib structure.

5. The lower rib caps are attached to the lower edge 108 of the trimmed webs 100.

6. Spar attachment brackets 110 and 112 are fabricated and attached to the ends of 114 and 116 of the trimmed webs 100.

The method of fabricating the rib structures 35–40 is as follows:

1. A plurality of webs are formed to a size at least as large as the largest rib web 100 with integral upper rib caps 102 and integral spar attachment brackets 110 and 112 respectively.

2. The lower edge 108 of each of the plurality of rib webs 100 are trimmed a progressively greater amount so that there is a rib web of the proper size for each rib structure 35–40.

3. A plurality of lower rib caps 106 are formed.

4. The lower rib caps 106 are attached to the trimmed rib webs 100.

Still referring to FIG. 2 and additionally to FIG. 5, wherein a rib structure 35b, which can be substituted for the rib structure 35 shown in FIG. 3, is illustrated. For the rib structures 35–40, which are located between parallel spar segments 44b and 45b the rib structure 35b comprises two identical rib webs 120 and 120' similar to rib webs 100 shown in FIG. 3 having integral rib caps 122 and 122'. The rib caps 122 and 122' have surfaces 124 and 124' which have a substantially constant radius of curvature in the chordwise direction about equal to the radius of curvature of the surface 28 and furthermore have a taper angle 63b in the spanwise direction equal to the taper angle 27. The rib webs 120 and 120' have integral front spar attachment brackets 134 and 134' respectively, and rear spar attachment brackets 136 and 136' respectively. The rib web 120' is inverted and joined near its lower edge 126' to the lower edge 126 of rib web 120 by fasteners, typically in the form of rivets 128.

The method of fabricating the rib structures 35–40 according to the FIG. 5 approach is as follows:

1. A plurality of rib webs 120 are formed having integral upper rib caps 122 and integral spar attachment brackets 134 and 136.

2. The rib webs 120 are joined together by twos by progressively overlapping the lower edges 126 and joining them together to form the rib structures of different sizes. The amount of overlap will depend upon the taper angle 63b, and if this overlap becomes large some trimming of the brackets 134 and 136 may be necessary.

For the rib structures 41–43 the rib webs 120 must be fabricated without the flanges 134 and 136. The brackets 84 and 86 illustrated in FIG. 3 can be used and attached in the manner previously described. Furthermore, the rib webs 120 can be formed without integral rib caps 122 and rib caps similar to cap 56 illustrated in FIG. 3 can be formed and attached by methods previously described.

The rib structures are described and shown as mounted between spars. The rib structures could be designed to run the full length of the chord of the airfoil with the spars passing through aperatures in said rib structures. In all cases the amount of tooling required is minimized.

While the method for fabricating the rib structures has been described with reference to particular embodiments, it should be understood that such embodiments are merely illustrative as there are numerous variations and modifications which may be made by those skilled in the art. Furthermore, it is readily apparent that the method of fabricating rib structures could be applied to any substructure of a main structure, or segment thereof, having a spanwise taper and at least one surface having a constant radius of curvature in the chordwise direction. Thus, the invention is to be construed as being limited only by the spirit and scope of the appended claims.

What is claimed is:

1. A method of fabricating a plurality of rib structures for at least a segment of an airfoil which has a spanwise taper in thickness, varies in chord length, and has at least one aerodynamic surface having a substantially constant radius of curvature in the chordwise direction, said airfoil having said plurality of said rib structures at discrete spanwise locations, comprising the steps of:
    forming a plurality of rib webs having upper and lower edges and first and second ends, said upper edges conforming to the radius of curvature of said segment; and
    trimming at least one of said ends of each of said plurality of rib webs in amounts to form a plurality of pairs of rib webs of corresponding chords with at least some of said pairs having different chords from other of said pairs; and
    coupling said corresponding rib web pairs together to produce said respective rib structures, said rib webs being coupled at their lower edges in inverted relationship to one another with respective rib structures having their lower edges progressively overlapped to form said plurality of rib structures to different heights.

2. The method as set forth in claim 1, wherein said plurality of rib webs are formed with integral upper rib caps having upper surfaces conforming to said segment and the additional step of trimming at least one end of said plurality of upper rib caps in progressively greater amounts such that there is an upper rib cap having a length substantially equal to said length of said upper edge of each of said plurality of trimmed rib webs.

3. The method as set forth in claim 1, including the steps of:
    forming a plurality of upper rib caps having upper surfaces conforming to said segment and a length substantially equal to the length of said upper edge of said largest of said plurality of rib webs;
    trimming at least one end of said plurality of rib caps progressively greater amounts such that there is an upper rib cap having a length substantially equal to said length of said upper edge of each of said plurality of trimmed rib webs;
    joining said plurality of upper rib caps to the corresponding upper edges of said plurality of rib structures.

4. The method as set forth in claim 1 wherein said airfoil incorporates spanwise spars fore and aft of said plurality of rib structures and said plurality of rib webs are formed with integral brackets at each end adapted to be attached to said spars.

5. The method as set forth in claim 1 wherein said airfoil incorporates spanwise spars fore and aft of said plurality of rib structures including and the additional steps comprising of:
    forming brackets adapted to be attached to said ends of said plurality of rib webs and said spars; and
    joining said brackets to said ends of said plurality of rib webs.

* * * * *